April 25, 1933.  W. E. KIDDER  1,905,642
SLED
Filed June 11, 1931    3 Sheets-Sheet 1
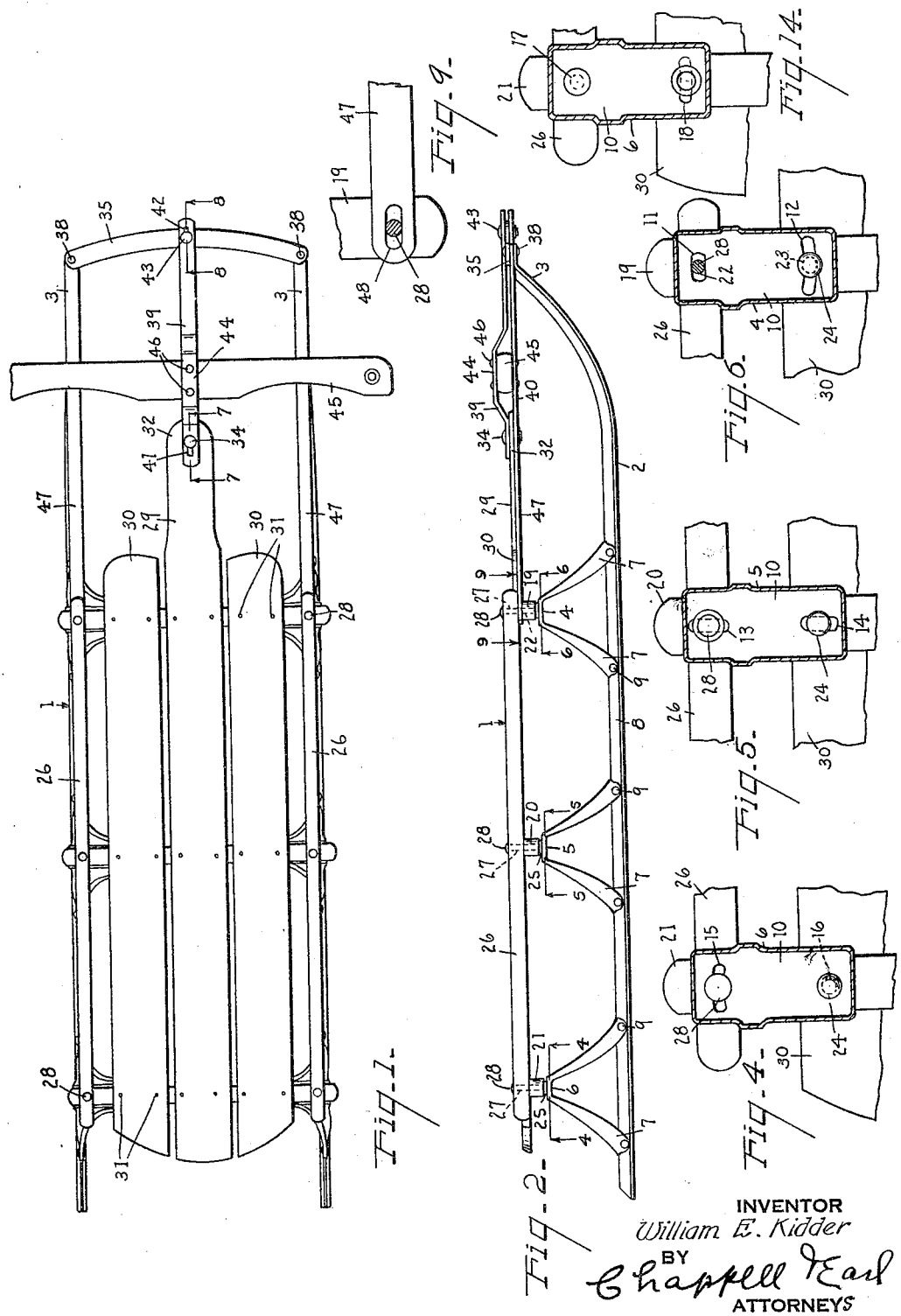
INVENTOR
William E. Kidder
BY
Chappell Earl
ATTORNEYS

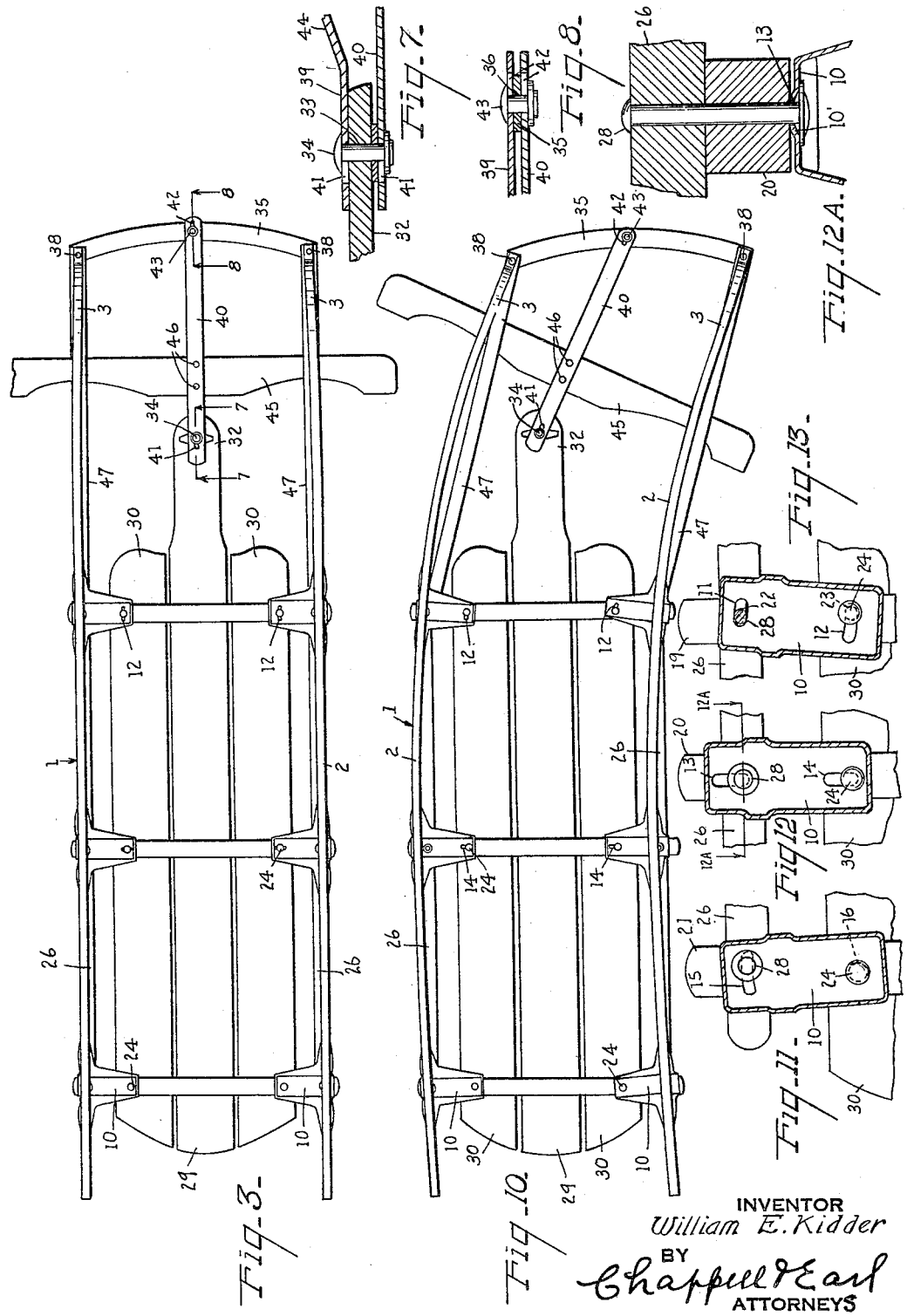

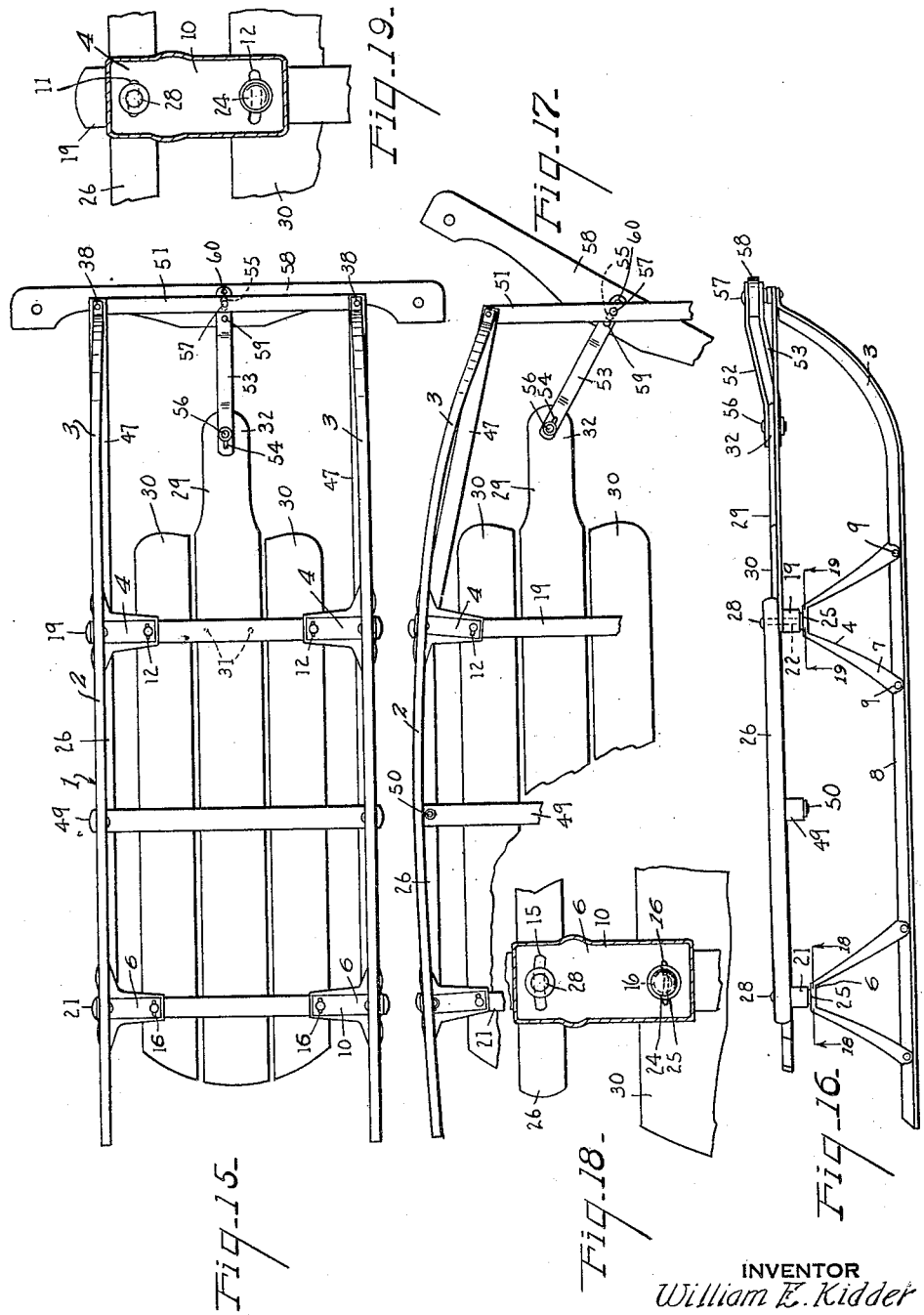

Patented Apr. 25, 1933

1,905,642

UNITED STATES PATENT OFFICE

WILLIAM E. KIDDER, OF KALAMAZOO, MICHIGAN, ASSIGNOR TO KALAMAZOO SLED COMPANY, OF KALAMAZOO, MICHIGAN

SLED

Application filed June 11, 1931. Serial No. 543,509.

The main object of the invention is to provide a steering sled which may be easily and accurately steered by the occupant while coasting at varying speeds.

Another object of the invention is to provide a steering sled which is economical to manufacture, simple to construct, and efficient in operation.

A still further object of the invention is to provide a steering sled which may be steered without retarding the speed thereof.

A still further object of the invention is to provide a steering sled having means associated therewith for obviating skidding when the sled is turned.

Objects relating to details and economies of my invention will appear from the description to follow. The invention is defined and pointed out in the claims.

A structure which is a preferred embodiment of my invention is illustrated in the accompanying drawings, in which:

Fig. 1 is a top plan view of a sled constructed in accordance with my invention.

Fig. 2 is a side elevation of Fig. 1.

Fig. 3 is an inverted view of Fig. 1.

Fig. 4 is an enlarged fragmentary horizontal section taken on line 4—4 of Fig. 2.

Fig. 5 is a view similar to Fig. 4 taken on line 5—5 of Fig. 2.

Fig. 6 is a view similar to Fig. 4 taken on line 6—6 of Fig. 2.

Fig. 7 is an enlarged fragmentary view in longitudinal section taken on line 7—7 of Fig. 1.

Fig. 8 is an enlarged fragmentary view in longitudinal section taken on line 8—8 of Fig. 1.

Fig. 9 is an enlarged horizontal sectional view taken on line 9—9 of Fig. 2.

Fig. 10 is an inverted view similar to Fig. 3 showing the runners flexed for steering.

Figs. 11, 12 and 13 are views corresponding to Figs. 4, 5 and 6 respectively showing the bench seats in the positions they occupy when the runners are flexed to the position shown by Fig. 10.

Fig. 12A is a section on line 12A—12A of Fig. 12.

Fig. 14 is a view similar to Fig. 4 of a modification of the rear bench seat.

Fig. 15 is a view similar to Fig. 3 of another modification.

Fig. 16 is a side elevation of the structure shown in Fig. 15.

Fig. 17 is a fragmentary view similar to Fig. 15 showing the runners in flexed position for steering.

Fig. 18 is an enlarged fragmentary horizontal section taken on line 18—18 of Fig. 16, and Fig. 19 is a fragmentary section similar to Fig. 18 taken on line 19—19 of Fig. 16.

Referring to the drawings, a sled 1 constructed in accordance with my invention comprises a pair of runners 2 preferably of inverted T-shape cross section and having upwardly curved forward ends 3. The runners 2 are made of flexible metal such as steel or car spring steel preferably having a carbon content of about 0.65 to 0.75 per cent.

Mounted on the runners 2 are a front pair of knees 4, an intermediate pair of knees 5 and a rear pair of knees 6. The front, rear and intermediate knees are preferably of similar construction and consist of metal channels shaped so as to have outwardly diverging legs 7 which are secured to the web 8 of the runners 2 by means of rivets 9.

The knees are provided with inwardly extending bench seats 10, each having a pair of pivot holes or slots spaced longitudinally of the bench seats therein. In the adaptations illustrated by Figs. 1 to 13 inclusive the front bench seats are each provided with an outer relatively short substantially straight or slightly curved transverse slot 11 and an inner relatively long curved slot 12. The seats of the intermediate knees 5 are provided with longitudinally spaced relatively long slots 13 and 14. The seats of the rear knees 6, as indicated by Figs. 4 and 11, are each provided with an outer relatively long curved slot 15 and an inner circular pivot hole 16. If desired, the bench seats 10 of the rear knees 6 may be provided with an outer circular pivot hole 17 and an inner relatively long curved slot 18, as indicated by Fig. 14. Again, if desired, the bench seats of the rear knees 6 may be provided with slots similar to those of the seats of the front knees 4 as indicated by Fig. 6, with slots 11 and 12 reversed to take care of the flexing of the runners 2 (see Fig. 19). Similarly, the front knees may be provided with bench seats similar to those provided for the rear knees, as indicated by Figs. 4 and 11, having the circular opening 16 and the curved slot 15 reversed as pointed out above. All bench seat openings are embossed upwardly about 1/35 of an inch to reduce friction.

A front bench 19, an intermediate bench 20 and a rear bench 21 are mounted on the bench seats 10 of the knees 4, 5 and 6 respectively and are provided with spaced outer and inner holes 22 and 23 which register with the inner and outer slots provided in the bench seats of the knees. Secured in each of the holes 23 of the benches is a headed stud 24 which loosely engages the seats at the inner slots therein. The headed studs 24 are preferably provided with washers 25 between the seats and the benches adjacent the peripheries of the inner slots thereby reducing friction.

Raves 26 are mounted on the benches at the ends thereof and are provided with holes 27 which register with the outer holes provided in the benches. Headed studs 28 are disposed in these aligned holes and slots for securing the raves, benches and seats together. The connection between the seats and benches, however, is such that the former are free to slide relative to the latter. The friction between the benches and the knees is greatly reduced by embossing the benches at the holes and slots through which the bolts extend as clearly shown by Fig. 12A. The embossing is indicated by the numeral 10'.

The middle top board 29 and side top boards 30 are rigidly secured to the top of all benches by means of fastening members such as nails or rivets 31 so that the benches and boards provide a platform or body that is substantially rigid. The central top board 29 is provided with a forwardly projecting portion 32 having an opening 33 therein for a headed pin 34. A cross bar 35 having a central opening 36 is pivoted to the forward ends 3 of the runners 2 by pivots 38.

Upper and lower steering lever members 39 and 40 are disposed above and below the forwardly projecting portion 32 of the middle board 29 and the central portion of the cross bar 35. The steering lever members are provided with longitudinal slots 41 and 42 which are aligned with the openings 33 and 36 respectively.

The headed pin 34 engages the slots in the rear ends of the steering lever members providing a lost motion connection therefor to the forwardly extending portion 32 of the platform. A headed pin 43 on the cross bar 35 similarly engages the slot in the forward end of the steering lever.

The slots 41 and 42 extend in opposite directions away from the pins 34 and 43 when the runners are in normal or unflexed position so that when the runners 2 are flexed for turning, as shown by Fig. 10, the effective length of the steering lever varies to correspond to the change in the distance between the pins 34 and 43.

The upper steering lever member 39 is preferably provided with an upwardly extending offset portion 44 for accommodating a steering bar 45 between the steering lever members as shown. The steering bar 45 is secured to the steering lever by rivets 46.

Links 47 of flat substantially straight bars or straps of steel are pivoted at their forward ends to the forward ends of the runners 2 by the pivots 38. The rear ends of the links 47 are provided with longitudinal slots 48 which receive the bolts 28 which secure the front bench to the raves 26. The rear ends of the links 47 are preferably disposed between the raves and the front bench 19 as shown by Figs. 2 and 9.

When the runners 2 are flexed, as shown by Fig. 10, by the steering bar 45, the links 47 have their effective lengths reduced because they are called upon to occupy chord-like positions relative to the arcuate runners 2. The slots 48 allow the effective lengths of the links 47 to change in accordance with the flexing of the runners 2. The slots in the seats of the knees also permit the knees to slide naturally in accordance with the curvature of the runners 2, the intermediate seats sliding longitudinally relative to the intermediate bench as indicated by Fig. 12 to permit the intermediate portions of the runners to bow in or out as the case may be.

The slidable seats 10, the slidable steering lever, and the slidable links 47 all combine with each other to provide a steering sled having runners which are possessed of an extremely high degree of flexibility and easy steering and also permits the flexing of the runners throughout the lengths thereof.

Referring now to the modification illustrated by Figs. 15 to 19 inclusive, the sled shown comprises runners 2 having front and rear knees 4 and 6 mounted thereon by rivets 9. The knees 4 and 6 are provided with seats 10 having longitudinally spaced slots therein for permitting the seats to turn relative to the benches 19 and 21 mounted thereon. The seat of the front knee 4 is provided with an outer relatively short substantially straight transverse slot 11 and an inner relatively long curved slot 12. The rear seat is provided with an outer relatively long curved slot 15 and a relatively short slightly curved inner slot 16. The front and rear benches 19 and 21 are secured to the seats 10 by means of headed studs 28 and 24 as described above in connection with Figs. 1 to 14. The raves 26 are provided with an intermediate cross supporting member 49 secured thereto by bolts 50. The middle top board 29 and the side top board 30 are rigidly secured to the benches 19 and 21 by means of spaced fastening members such as nails 31. The bottom boards are similarly rigidly secured to the cross supporting member 49 by nails 31. The top boards, the benches and the supporting member thereby comprise a substantially rigid platform about which the runners 2 and the knees 4 and 6 may be turned without disturbing any of the parts thereof.

As described above, the forward ends 3 of the runners 2 are provided with pivots 38 for pivoting a cross bar 51 and the forward ends of the links 47. The cross bar in this embodiment is preferably a substantially straight member, whereas in the embodiment before described, the cross bar 35 is curved outwardly as shown by Fig. 1. The links 47 are provided with slots at their rear ends for permitting the effective length thereof to change in accordance with the flexing of the runners 2 as hereinbefore described.

Relatively short upper and lower steering lever members 52 and 53 having slotted ends at 54 and 55 are pivoted to the forwardly extending portion of the platform and the center of the cross bar 51 by means of headed pins 56 and 57. The steering lever members 52 and 53 are preferably provided with offset ends so that the outer ends thereof may be disposed above the cross rod 51 as shown by Fig. 16. A steering bar 58 is secured to the forward end of the steering lever by means of rivets 59 and 60.

The operation of the sled illustrated in Figs. 15 to 19 is similar to that described above in connection with the embodiment illustrated by Figs. 1 to 14.

The above arrangement of the rigid platform and the movable knees is such that when the steering bar is turned, the steering mechanism is actuated so as to produce bends in the runners which are segments of circles having different radii. the inner runner being bent much more sharply than the outer runner. This constitutes means whereby the skidding action of the rear end of the sled is obviated while making a turn which materially reduces the side or skidding friction that has heretofore retarded sleds in their forward movement while making a turn. Furthermore, both runners flex uniformly from end to end which results in the sled taking a turn with little or no retarding friction.

From the above description, it will be obvious to those skilled in the art that I provide a steering sled which is easily, quickly, accurately and dependably steered by the occupant thereof when coasting at varying speeds. I further provide a steering sled which may be constructed with a minimum of material and effort and of light weight without affecting the strength of the structure thereof. The above construction further results in a steering sled which may be steered without materially retarding the speed thereof.

While I have illustrated and described preferred modifications of the invention, it is to be understood that various minor details may be changed therein without departing from the spirit of the invention which is limited only by the prior art and the scope of the following claims.

Having thus described my invention, what I claim as new and desire to secure by Letters Patent, is:

1. In a sled, the combination with a pair of flexible runners having upwardly curved forward ends, of pairs of front and rear knees mounted on said runners and having inwardly extending bench seats each provided with a plurality of longitudinally spaced inner and outer slots, the front seats each having a relatively short slightly curved transverse outer slot and a relatively long transverse curved inner slot, the rear seats each having a relatively short slightly curved transverse inner slot and a relatively long curved transverse outer slot, front and rear benches mounted on said seats having inner and outer holes registering with said slots, headed studs disposed in said inner holes and loosely engaging said seats at said inner slots, raves mounted on said benches having holes registering with said outer holes, headed studs disposed in said registering outer holes and slots securing said raves, benches and seats together, said seats being free to move slidably relative to said benches, floorboards rigidly secured to said benches, the middle floor-board having a central opening in its front end, a cross bar pivoted to the forward ends of said runners and having a central opening, a steering lever having slots at the ends thereof registering with the openings in said middle top board and said cross bar, pins loosely disposed in said registering slots and openings, a steering bar secured to said steering lever, and links having the front ends thereof pivoted to the forward ends of said runners and the rear ends thereof provided with longitudinal slots receiving said outer studs between said raves and said front bench seats.

2. In a sled the combination with flexible runners having upwardly curved forward ends, of front, and rear knees mounted on said runners and having inwardly extending bench seats, the front seats each having a relatively short substantially straight transverse outer slot and a curved relatively long transverse inner slot, the rear seats each having an inner hole and a relatively long curved transverse outer slot, front and rear benches mounted on said seats having inner and outer holes registering with said slots and holes, headed studs disposed in said inner holes and loosely engaging said seats at said inner slots, raves mounted on said benches having holes registering with said outer holes, headed studs disposed in said registering outer holes and slots securing said raves, benches and seats together, said seats being free to move slidably relative to said benches, top boards rigidly secured to said benches, said platform having a central hole at its forward end, a cross bar pivoted to the forward ends of said runners having a central opening, a steering lever having slots at the ends thereof registering with the openings in said platform and said cross bar, pins disposed in said registering slots and openings, a steering bar secured to said lever and links having the front ends thereof pivoted to the forward ends of said runners and the rear ends thereof provided with longitudinal slots receiving said outer studs between said raves and said front bench seats.

3. In a sled, the combination with flexible runners having upwardly curved forward ends, of front and rear knees mounted on said runners and having inwardly extending bench seats each provided with a plurality of longitudinally spaced inner and outer slots, front and rear benches mounted on said seats having inner and outer holes registering with said slots, headed studs disposed in said inner holes loosely and engaging said seats at said inner slots, raves mounted on said benches having holes registering with said outer holes, headed studs disposed in said registering outer holes and slots securing said raves, benches and seats together, said seats being free to move slidably relative to said benches, tops rigidly secured to said benches, said top having a central opening at its front end, a cross bar pivoted to the forward ends of said runners and having a central opening, a steering lever having slots at the ends thereof registering with the openings in said top and said cross bar, pins disposed in said registering slots and openings, a steering bar secured to said steering lever, and links having the front ends thereof pivoted to the forward ends of said runners and the rear ends thereof provided with longitudinal slots coacting with said outer studs between said raves and said front seats.

4. In a sled, the combination with flexible runners having upwardly curved forward ends, of front, intermediate and rear knees mounted on said runners and having inwardly extending bench seats, the front seats each having a relatively short transverse outer slot and a relatively long transverse inner slot, the intermediate seats each having substantially straight longitudinally spaced relatively long longitudinal slots, the rear seats each having a circular inner pivot opening and a relatively long transverse outer slot, front, intermediate and rear benches mounted on said seats having inner and outer holes registering with said slots and pivot openings, headed studs disposed in said inner holes loosely and engaging said seats at said inner slots and pivot openings, raves mounted on said benches having holes registering with said outer holes, headed studs disposed in said registering outer holes and slots securing said raves, benches and seats together, said seats being free to move slidably relative to said benches, a top rigidly secured to said benches, said top having a central opening at its front end, a cross bar pivoted to the forward ends of said runners having a central opening, a steering lever having slots at the ends thereof registering with the openings in said top and said cross bar, pins disposed in said registering slots and openings, a steering bar secured to said steering lever, and links having the front ends thereof pivoted to the forward ends of said runners and the rear ends thereof provided with longitudinal slots coacting with said outer studs between said raves and said front seats.

5. In a sled, the combination with flexible runners having upwardly curved forward ends, of front and rear knees mounted on said runners and having inwardly extending bench seats, the front seats each having a relatively short substantially straight transverse outer slot and a relatively long curved transverse inner slot, the rear seats each having a circular outer hole and a relatively long curved transverse inner slot, front and rear benches mounted on said seats having inner and outer holes registering with said slots and holes, studs secured to said benches in said inner holes loosely engaging said seats at said inner slots, raves mounted on said benches and having holes registering with said outer holes, headed studs disposed in said registering outer holes and slots securing said raves, benches and seats together, said seats being free to move relative to said benches, a top rigidly secured to said benches, the top having a central opening at its front end, a cross bar pivoted to the forward ends of said runners and having a central opening, a steering lever having slots at the ends thereof registering with the openings in said top and said cross bar, pins loosely disposed in said registering slots and openings, a steering bar secured to said steering lever, and links having the front ends thereof pivoted to the forward ends of said runners and the rear ends thereof provided with longitudinal slots coacting with said outer studs between said raves and said front knee seats.

6. In a sled, the combination with flexible runners having upwardly curved forward ends, of a plurality of front and rear knees mounted on said runners and having inwardly extending bench seats, the front seats each having a relatively short substantially straight transverse outer slot and a relatively long curved transverse inner slot, the rear seats each having a circular inner hole and a relatively long curved transverse outer slot, front and rear benches, mounted on said seats having inner and outer holes registering with said slots and holes, studs secured to said benches in said inner holes and loosely engaging said seats at said inner slots and holes, raves mounted on said benches and having holes registering with said outer holes, studs disposed in said registering outer holes and slots securing said raves, benches and seats together, a top rigidly secured to said benches, said top having a central opening at its forward end, a cross bar pivoted to the forward ends of said runners having a central opening, a steering lever having slots in the ends thereof registering with the openings in said top and said cross bar, pins disposed in said registering slots and openings, a steering bar secured to said steering lever, and links having the front ends thereof pivoted to the forward ends of said runners and the rear ends thereof provided with longitudinal slots coacting with said outer studs between said raves and said front seats.

7. In a sled, the combination with flexible runners, of knees mounted on said runners, benches mounted on said knees, raves mounted on said benches, a top secured to said benches between said raves, a cross bar pivoted to the forward ends of said runners, a steering lever having slotted ends pivoted to the front end of said top and the center of said cross bar, a steering bar secured to said steering lever, and links having longitudinally slotted ends pivoted to the front knees and the forward ends of said runners, whereby when said runners are flexed, the effective lengths of said links are automatically adjusted.

8. In a sled, the combination with flexible runners having upwardly curved forward ends, knees mounted on said runners, links each having a slot in one end thereof pivoted to the forward ends of said runners and the front knees, and means for flexing said runners, said slots in said links permitting the effective lengths thereof to change in accordance with the flexing of said runners.

9. In a steering sled, the combination of flexible runners having upwardly curved front ends, front and rear knees secured to said runners, front and rear benches arranged on said knees, the front knees having transverse slots at their inner ends and the rear knees having transverse slots at their outer ends, the front knees being pivotally connected at their outer ends to the front bench, and the rear knees being pivotally connected at their inner ends to the rear bench, headed members on said benches engaging said slots in said knees, raves disposed at the outer ends of said benches, a top rigidly secured to said benches between said raves, a cross bar connecting the upturned forward ends of said runners, links constituting rave extensions pivotally connected to the forward ends of said runners and longitudinally slotted to receive the pivots for the outer ends of said front bench, and a steering lever having a pin and slot connection to said top and to said cross bar.

10. In a steering sled, the combination of flexible runners having upwardly curved front ends, front and rear knees secured to said runners, front and rear benches arranged on said knees, the front knees having transverse slots at their inner ends and the rear knees having transverse slots at their outer ends, the front knees being pivotally connected at their outer ends to the front bench, and the rear knees being pivotally connected at their inner ends to the rear bench, headed members on said benches engaging said slots in said knees, raves disposed at the outer ends of said benches, a top rigidly secured to said benches between said raves, a cross bar connecting the upturned forward ends of said runners, links constituting rave extensions pivotally connected to the forward ends of said runners and having a pivotal and sliding connection to the said front bench, and a steering lever connected to said top and to said cross bar, one of its connections comprising a pin and slot.

11. In a steering sled, the combination of flexible runners having upwardly curved front ends, front and rear knees secured to said runners, front and rear benches arranged on said knees, the front knees having transverse slots at their inner ends and the rear knees having transverse slots at their outer ends, the front knees being pivotally connected at their outer ends to the front bench, and the rear knees being pivotally connected at their inner ends to the rear bench, headed members on said benches engaging said slots in said knees, raves disposed at the outer ends of said benches, a top rigidly secured to said benches between said raves, a cross bar connecting the upturned forward ends of said runners, links constituting rave extensions pivotally connected to the forward ends of said runners and to said front bench to permit a relative sliding movement of the links, and a steering lever connected to said top and to said cross bar.

12. In a steering sled, the combination of flexible runners having upturned curved front ends; front and rear and intermediate knees secured to said runners; front, rear and intermediate benches arranged on the front, rear and intermediate knees respectively, the front knees having transverse slots in their inner ends and the rear knees having transverse slots at their outer ends, the intermediate knees having longitudinal slots at their inner and outer ends, the front knees being pivotally connected at their outer ends to the front bench and the rear knees being pivotally connected at their inner ends to the rear bench; headed members on said front, intermediate and rear benches engaging said slots in said knees; raves disposed on said benches; a top rigidly secured to said benches between said raves; a cross bar connecting the upturned forward ends of said runners; links constituting rave extensions pivotally connected to the front ends of said runners and having a pivotal and sliding connection to the front bench; and a steering lever pivotally connected to said top and to said cross bar, at least one of said connections comprising a pin and slot.

13. In a steering sled, the combination of flexible runners having upturned curved front ends; front and rear and intermediate knees secured to said runners; front, rear and intermediate benches arranged on the front, rear and intermediate knees respectively, the front knees having transverse slots in their inner ends and the rear knees having transverse slots in their inner ends and the rear knees having transverse slots at their outer ends, the intermediate knees having longitudinal slots at their inner and outer ends, the front knees being pivotally connected at their outer ends to the front bench and the rear knees being pivotally connected at their inner ends to the rear bench; headed members on said front, intermediate and rear benches engaging said slots in said knees; raves disposed on said benches; a top rigidly secured to said benches between said raves; a cross bar connecting the upturned forward ends of said runners; links constituting rave extensions pivotally connected to the front ends of said runners and to the front bench to permit a relative sliding movement of the links, and a steering lever connected to said top and to said cross bar.

In witness whereof I have hereunto set my hand.

WILLIAM E. KIDDER.